United States Patent Office 2,775,879
Patented Jan. 1, 1957

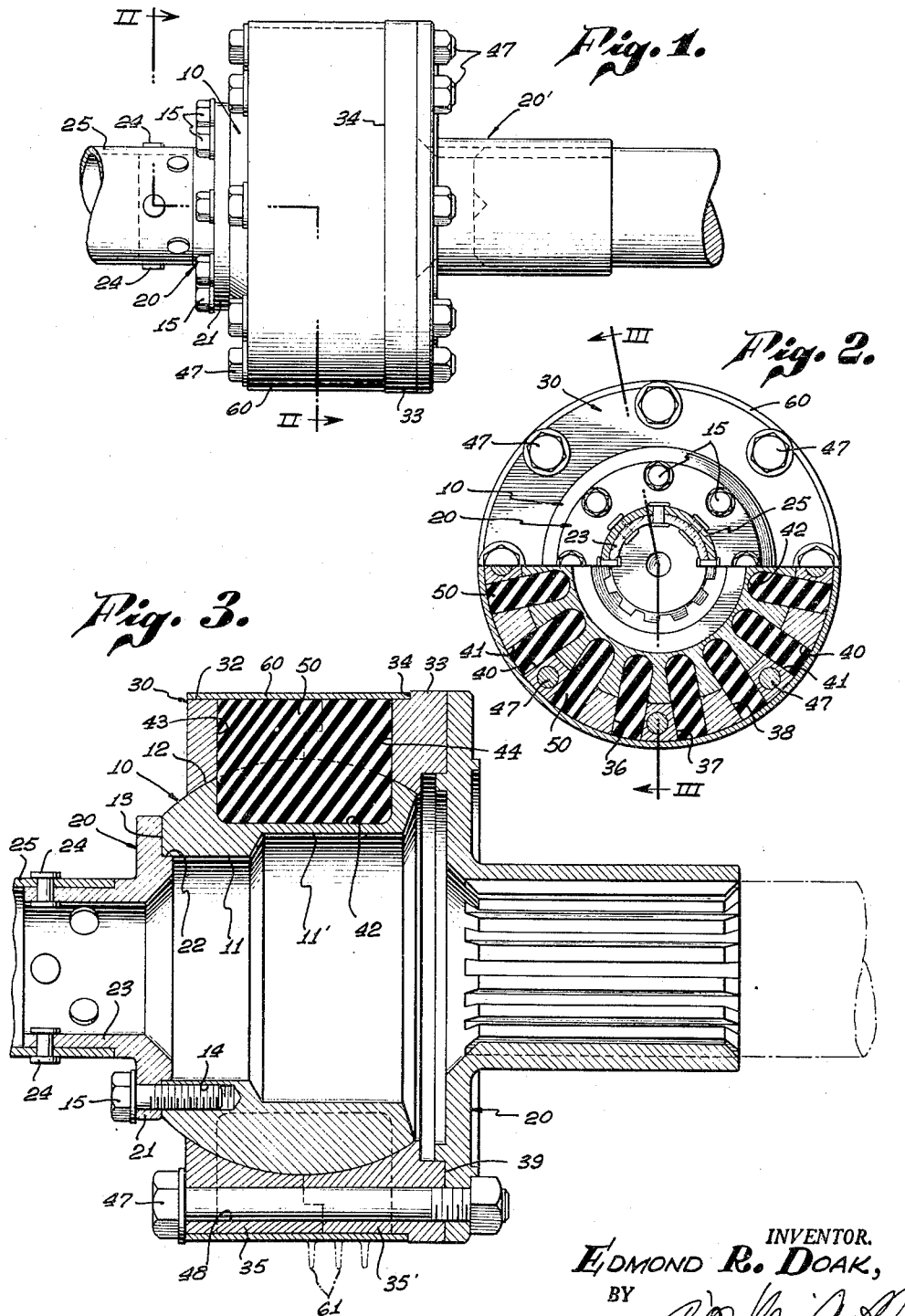

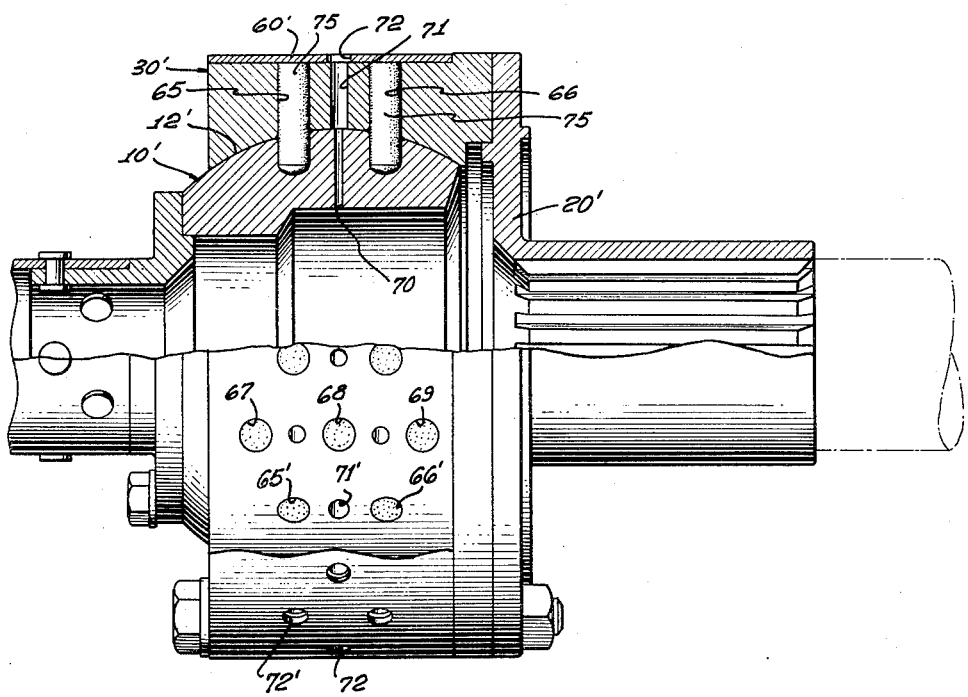
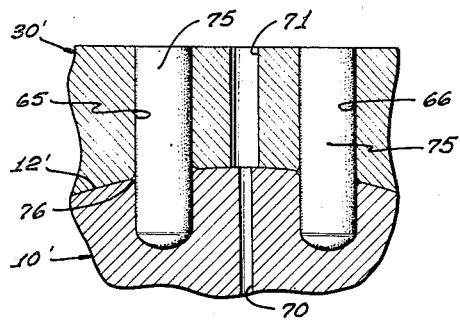
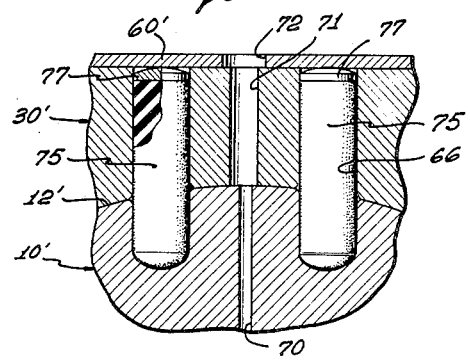

2,775,879

TORQUE TRANSMITTING COUPLING

Edmond R. Doak, Los Angeles, Calif.

Application February 15, 1954, Serial No. 410,087

11 Claims. (Cl. 64—11)

This invention relates to a coupling device capable of effectively transmitting torque from a driving shaft to a driven shaft, even though the shafts are angularly misaligned and at the same time provides torsional vibration isolation with concurrent constant angular velocity. The device of the present invention is particularly well adapted for use in those installations where a prime mover or a driving shaft tends to transmit and deliver a series of impulses or rapidly varying high-frequency torque impulses which have the effect of hammer blows on the driven shaft or on gearing associated therewith.

In many instances a prime mover, such as a very high compression ratio internal combustion engine, is connected by means of couplings to a driven shaft through a spline connection and the driven shaft, in turn, carries pinions or gears by means of which the angular velocity or rotational speed of an ultimate driven shaft is modified. Each power impulse of the prime mover in such system results in a virtual hammer blow at the spline and between engaging teeth of gearing carried by the driven shaft. Such hammer blows cause flaking and spalling of the gears and tremendous stresses are set up in the spline connections, causing the splines to break off. Crystallization of driven shafts takes place, frequently breaking them and causing damage to machinery and surroundings.

The present invention efficiently transmits torque from a drive shaft to a driven shaft, and also acts as an impulse dampener, preventing the hammer blow effect normally obtained. The present coupling device also automatically compensates and adjusts itself to angular deviation between drive and driven shafts without substantial loss in efficiency. Generally stated, the flexible drive coupling of the present invention transmits torque through a series of completely enclosed and restrained blocks of rubber or rubber composition, a portion of each block being embedded in a driving member and another portion being embedded in the driven member, each block being subjected to shear. The rubber blocks snugly fit into recesses formed in the driven and driving members and are preferably prestressed by being under compression even when the coupling is at rest, whereby a radial thrust is exerted and frictional resistance between opposing surfaces of driving and driven members is minimized.

The driving and driven members include juxtaposed complementary surfaces which are portions of a sphere, whereby torque may be transmitted by the coupling despite angular misalignment of the driving and driven axes. As will be seen, torque may be transmitted through the coupling in either direction, i. e. either member may be the driving member.

An object of the present invention, therefore, is to provide a novel, lightweight, torque-transmitting coupling affording virtually complete vibration isolation of driving from driven members.

Another object is to disclose a device of the above character adapted to be used where driving and driven members are not coaxial.

A further object is to disclose such a device employing resilient members transmitting torque by shear.

Another object is to disclose such a device which may be easily and quickly disassembled and reassembled for maintenance or replacement of the component parts when necessary.

Other objects are to provide means in the above device for facilitating dissipation of heat generated in the torque-transmitting elements; to provide such a device of rugged construction but of comparatively low manufacturing cost; and generally to improve upon torque-transmission couplings used in the past.

Additional objects and advantages will become apparent to those skilled in the art from a study of the following description and accompanying drawing illustrating, by way of example, a preferred structure for practicing the invention. In order to facilitate understanding, reference will be had to the appended drawings, in which:

Fig. 1 is a side elevation of the torque-transmitting device of the present invention.

Fig. 2 is an end view, partly broken away, of the device as seen on line II—II of Fig. 1.

Fig. 3 is a transverse section taken along the plane III—III indicated in Fig. 2.

Fig. 4 is a side elevation, partly in section, of a further form of device.

Fig. 5 is an enlarged, partly diagrammatic axial section through a portion of the torque-transmitting device shown in Fig. 4, illustrating a manner in which the elastic or resilient inserts may be inserted.

Fig. 6 is an enlarged, partly diagrammatic, axial section showing one method whereby the insert is prestressed during assembly.

In general, the device may be said to consist of an inner ball unit generally indicated at 10, means carried by the ball unit for connection to a hub or tube adapter, such as is indicated at 20, and an external housing unit generally indicated at 30, the housing unit being resiliently connected to the ball unit by a plurality of circumferentially spaced, radially directed blocks or elements.

By referring to the drawings, it will be noted that the inner ball unit 10 is in the form of a spherical segment having a symmetrical centrally disposed axis of revolution and a through bore along said axis, such bore being indicated at 11, and an enlarged bore coaxial therewith at 11'. The external spherical surface is indicated at 12.

The ball unit 10 is provided with an end face 13 lying in a plane transverse to the axis of revolution and means such as the threaded recesses 14 are provided in said face to facilitate the connection of the ball unit to a hub by means of bolts or machine screws 15.

The hub may comprise a tube adapter 20 having a radial flange 21 provided with an annular shoulder 22 adapted to fit bore 11 so as to positively center the tubular extension or hub portion 23 with respect to the ball unit. The tubular extension may be provided with a plurality of spaced ports through which rivets 24 may extend and connect the hub to a tubular drive shaft 25.

The annular housing unit 30 is provided with an internal surface in the form of a spherical zone adapted to slidably mate with the external surface 12 of the ball unit 10. The housing unit may also be provided with an external cylindrical surface 32, such surface being preferably provided with a lip 33 forming a shoulder 34.

A plurality of circumferentially spaced radially directed recesses, such as the recesses 36, 37, 38 and the like, are formed in the housing unit and extend into the ball unit. Each of these recesses is provided with parallel sides, such as the sides 40 and 41, these sides extending in the direction of the axis of revolution so that recess is elongated in the direction of such axis. Each recess is also provided with a bottom 42 parallel to the axis of revolution and with end walls, such as 43 and 44 which are perpendicular to said axis.

The housing unit 30 is preferably made in two sections, such as 35 and 35' mating in a transverse plane or planes so as to facilitate the assembly of the entire device. The two parts of the housing unit are held together firmly by means of bolts 47 extending through suitable bores 48 circumferentially spaced between the recesses 36, 37, 38 and the like.

A block of resilient composition, such as the block 50, is snugly fitted into and virtually completely fills each of two or more of the recesses. The device may have 8 to 20 of the circumferentially spaced recesses and not all of them need be filled with the resilient torque-transmitting and impulse dampening blocks, the number of blocks employed depending upon torque, operating conditions, and other factors. These rubber blocks are subjected to considerable pressure and stress during the transmission of power and it has been found desirable to employ natural rubber or synthetic rubber compositions, these compositions desirably having a Shore hardness of about 50 and preferably between 60 and 70.

It is to be noted that these elastic resilient blocks fill the recesses completely. In order to properly retain these blocks within recesses that are open peripherally, a retainer ring, preferably in the form of a lightweight cylinder 60, is slipped over the external cylindrical surface 32 of the housing unit 30 and retained in place by means of a snap ring or in any other desired manner. The retaining ring 60 may be provided with fins or perforations for the purpose of increasing the heat-radiating characteristics of the housing and thereby dissipate the heat generated within the resilient composition blocks during operation. Heat-radiating fins of the character stated are indicated in dotted lines at 61.

The end face 39 of the housing unit lies in a plane transverse to the axis of rotation and is formed to receive, align and hold an adapter flange or other means 20' whereby the housing unit can be connected to a driven shaft. The bolts 47 may be employed, not only for the purpose of holding the housing unit together, but also to connect the adapter 20' or splined hub thereto.

The form of device illustrated in Fig. 4 employs an inner ball unit 10' and an external housing 30', these two units being provided with mating, spherical surfaces 12'. A number of recesses, each provided with a closed bottom in the ball unit 10' and extending radially outward in planes perpendicular to the axis of the shaft and continuing through the housing's 30' peripherally open ends are provided, such recesses being indicated at 65, 66, 67, 68 and 69. Each of these recesses may be circular or polygonal in cross section but preferably circular. Between certain of such recesses the ball unit 10' may be provided with radial cooling ports 70 adapted to communicate with radial cooling ports 71 formed in the external housing unit 30'. Moreover, the retaining ring 60' may also be provided with ports 72 in alignment with channels or ports 71, thereby permitting cooling air to pass through the entire coupling.

Each of the recesses, such as 65—69 (or any desired number thereof) is completely filled with a rod or block of resilient composition. As previously indicated, it has been found desirable to prestress these elastic blocks. Figs. 5 and 6 illustrate one manner in which this can be accomplished and emphasize the desirability of prestressing. For example, in Fig. 5 a block of resilient composition 75 corresponding in contour to the recess 65 is pressed into such recess so as to fit the recess snugly. It may be noted that the margins 76 at the spherical interface 12' at the edges of the recess 65 may be slightly rounded or smoothed out as to prevent sharp corners from contacting the resilient block 75 when the ball unit 10' is partially rotated within the housing unit 30'.

Fig. 6 illustrates the block 75 in a prestressed condition. It will be noted that during assembly, a filler block 77 is placed upon the upper or outward end of the resilient block 75 before the retaining ring 60' is applied. Considerable pressure is thus exerted upon the resilient block 75 in an endwise direction and such block is in compressed or prestressed condition. Such resilient blocks 75 exert an outward thrust which minimizes and actually reduces frictional resistance between the opposing or mating surfaces 12' of the ball unit and housing unit. Metal-to-metal contact is thus minimized and vibrations and shocks are absorbed by the prestresed resilient composition blocks. It is to be remembered that desirable characteristics of rubber compositions are enhanced when such rubber is under stress; moreover, the contraction of elongated rubber due to heat is reduced by having the composition under compression at all times.

As previously stated, numerous problems arise in connecting a prime mover to gearing or driven shaft, these problems being accentuated when the prime mover has to be driven at various speeds and is of a reciprocating, high-compression type, since under those conditions, the prime mover delivers torque in the form of hammerlike blows. The usual couplings and spline connections are very often completely sheared off and have a very short life. By reason of the tremendous stresses set up, the ordinary connections and couplings are heavy. The present invention provides a self-dampening, torque-transmitting coupling in that the rapidly fluctuating, hammerlike blows are dampened by the resilient, elastic blocks 50. Moreover, since the blocks completely fill the recesses, the coupling is self-aligning. Relatively lightweight couplings can carry great loads when constructed in accordance with the present invention.

All changes and modifications coming within the scope of the appended claims are embraced thereby.

I claim:

1. A torque-transmitting, impulse-dampening and self-aligning coupling for drive shafts and the like, comprising: an inner ball unit in the form of a spherical segment having an axis of revolution, an end face transverse to said axis of revolution and a bore along said axis; means carried by said end face of the ball unit for connection to a hub; an annular housing unit having an internal surface in the form of a spherical zone adapted to slidably mate with the external surface of the ball unit, and an external cylindrical surface; a plurality of circumferentially spaced, radially directed, parallel sided recesses formed in the housing unit and extending into the ball unit, aid recesses having end walls perpendicular to said axis; said housing unit being in two sections mating in a plane perpendicular to the axis of revolution; means for connecting said sections together; a block of resilient composition snugly fitted into a number of said recesses; and a retainer ring carried by the outer cylindrical surface of the housing unit to retain said blocks immovably in said recesses.

2. A torque-transmitting, self-dampening and self-aligning impulse-absorbing coupling for drive shafts and the like, comprising: an inner ball unit in the form of a spherical segment having an axis of revolution, an end face transverse to said axis of revolution and a bore along said axis; means carried by said end face of the ball unit for connection to a hub; an annular housing unit having an internal surface in the form of a spherical zone adapted to slidably mate with the external surface of the ball unit, and an external cylindrical surface; a plurality of circumferentially spaced, radially directed recesses formed in the housing unit and extending into the ball unit; said housing unit being in two sections mating in a plane perpendicular to the axis of revolution; means for connecting said sections together; a block of resilient composition snugly fitted into and virtually completely filling each of a number of said recesses, and a retainer ring carried by the outer cylindrical surface of the housing unit and adapted to retain the blocks in said recesses.

3. The device as stated in claim 2 wherein each of said blocks of resilient composition is pre-stressed and under compression.

4. The device as stated in claim 2 including radially extending passageways for cooling air extending through said ball unit and housing unit.

5. The device as stated in claim 2 including cooling fins carried by the retainer ring.

6. The device as stated in claim 2 wherein the resilient composition has a Shore hardness of above 50.

7. A torque-transmitting, self-dampening and self-aligning coupling for drive shafts and the like, comprising: an inner ball unit in the form of a spherical segment having an axis of revolution, an end face transverse to said axis of revolution and a bore along said axis; means carried by said end face of the ball unit for connection to a hub; an annular housing unit having an internal surface in the form of a spherical zone adapted to slidably mate with the external surface of the ball unit; a plurality of circumferentially spaced, radially directed, parallel sided recesses formed in the housing unit and extending into the ball unit, said recesses being elongated in the direction of the axis of revolution and each being provided with a bottom paralleling the axis and having end walls perpendicular to said axis; said housing unit being in two sections mating in a plane perpendicular to the axis of revolution; means for connecting said sections together; and a block of resilient composition snugly fitted into and virtually completely filling each of a number of said recesses.

8. A torque transmitting coupling comprising: an inner ball unit in the form of a spherically convexed segment rotatable about an axis of revolution; means for connecting said unit to a rotatable shaft; a housing unit having an internal spherically concaved surface adapted to slidably engage said segment, said housing being made up of two sections mating along a plane transverse to said axis and including means for connecting said sections together; a plurality of circumferentially spaced, radially directed recesses formed in the housing unit and extending into the ball unit; a resilient member snugly fitted into each of a number of said recesses; and means for connecting said housing unit to a second rotatable shaft.

9. The invention as stated in claim 8 wherein said housing unit is provided with a virtually cylindrical surface and said recesses extend outwardly thereto, and including a retaining band of relatively high heat conductivity material, said band surrounding said cylindrical surface and in contact with the outer ends of said resilient members.

10. A torque-transmitting coupling as stated in claim 8, including means for retaining said resilient members in their respective recesses, whereby each of the resilient members is prestressed and is under compression at all times.

11. A torque-transmitting coupling as stated in claim 8, including means in heat-exchange relationship to the resilient members for dissipating heat generated within the resilient members and coupling during operation.

References Cited in the file of this patent
FOREIGN PATENTS
28,210   Great Britain _____ Dec. 8, 1913